No. 696,892. Patented Apr. 1, 1902.
E. KEMPSHALL.
GOLF BALL.
(Application filed Jan. 20, 1902.)
(No Model.)

Witnesses:
Robert Head
C. A. Jarvis.

Inventor:
Eleazer Kempshall,
By his Attorney,
F. H. Richards.

United States Patent Office.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 696,892, dated April 1, 1902.

Application filed January 20, 1902. Serial No. 90,442. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to playing-balls, such as used in the game of golf and other games. Its object is to produce at low cost an efficient ball having the quality of being "dead" when given a light blow and exceedingly lively when struck a heavy blow.

Figure 1:
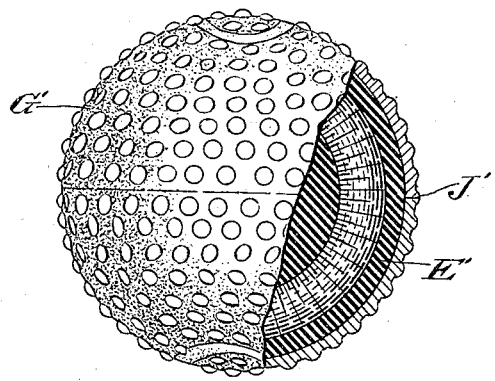
Figure 2:
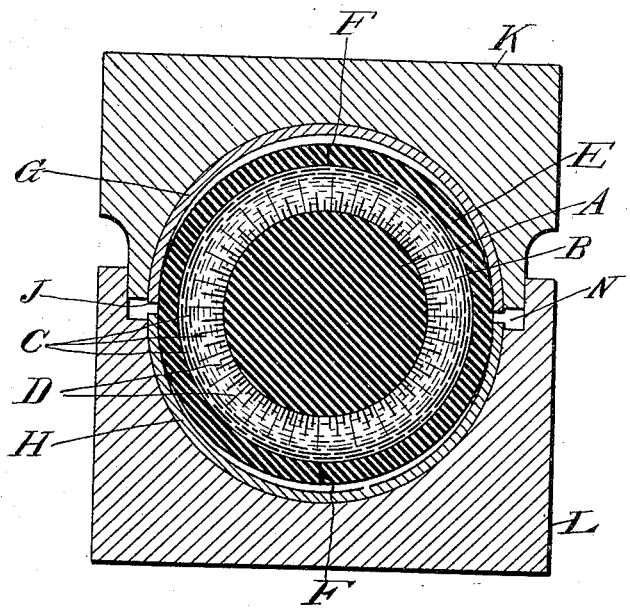

In the drawings forming a part of this specification, Figure 1 is a view of a ball made according to my improvements, being partly broken away, so as to exhibit its construction. Fig. 2 illustrates a stage in the process of completing the ball.

I preferably employ a large core made of gutta-percha, which is preferably introduced in a fluid condition and hardened within a suitable rubber envelop B, the gutta-percha being forced into said envelop to such an extent as to materially expand it, as set forth in an application filed by Francis H. Richards December 3, 1901, Serial No. 84,529, whereby the envelop, especially the exterior portion thereof, is put into a state of high longitudinal tension, as indicated by the broken curved lines C, the interior portion of the envelop is compressed by the exterior portion, as indicated by the radial lines D, and the core is held constantly under compression by said envelop. The combination of compresed core and distended envelop enhances the efficiency of the ball when struck a heavy blow. However, if desired, soft rubber may be otherwise employed for inclosing a core. Upon the compound rubber and gutta-percha filling I place a shell E of gutta-percha, preferably in the form of hollow hemispheres, the joint between them being indicated at F. Said shell I provide with a cover consisting of hemispheres G and H of celluloid, the joint J between these extending crosswise of the joint F between the gutta-percha shells. The parts thus assembled I place between heating and pressing dies K and L, preferably in such a manner that the joint J of the celluloid cover lies the same way as the joint N in the dies. I then heat the dies and bring them together with great force, the heat rendering the celluloid plastic and enabling it to conform to the shape of the dies and also to weld at the joint J. Preferably the heat is sufficient to also soften the gutta-percha shell and enable it to weld at the joint F. I thus form a double shell upon the rubber and gutta-percha filling which possesses great strength and durability, particularly since the weld or joint at F runs crosswise with the weld or joint at J', Fig. 1. The gutta-percha is thus caused to form one complete sphere, as at E', and the celluloid another complete covering, as at G'. The pressure of the dies compacts and solidifies both the celluloid and gutta-percha components of the shell, the confined mass of rubber and gutta-percha being sufficiently resisting to support the comparatively weak material of the shell under any desired degree of pressure of the forming-dies. By having the joints of the double shell run crosswise of each other the body portions of the several segments respectively reinforce the joints, and hence the liability of bursting is minimized.

It is to be understood that in case condensation of the bulk of the core takes place in the operation of compressing the shell upon the core it is due to the presence of air-spaces or impurities in the material. It is not essential in every way of practicing my invention that the core be condensed in bulk, so long as when the ball is finished the core is powerfully gripped by the shell, thereby enabling the shell and core to act conjointly, and hence vastly improve the playing qualities of the ball. It will be observed that the celluloid or other hard outer shell is supported by successive inner shells or layers of diminishing sizes and successively-increasing elasticities, the series of shells being preferably supported upon a solid or hard central core.

One feature of the present improvements consists of the use of any suitable and relatively hard outer shell supported upon a second shell of gutta-percha, this being supported upon a third shell or sphere of elastic material.

A further feature consists in the combination of a relatively hard outer shell upon a secondary gutta-percha shell and this second shell supported upon a rubber shell. The shell layer E lies between the principal elastic member B and the outer shell. The blow received by the latter is thus transmitted through successive members of graduated resistance. The gutta-percha shell layer is somewhat softer, less resisting, and more elastic than the celluloid, and the same comparison applies between the rubber sphere and said gutta-percha layer.

By providing a backing of gutta-percha in the shell I am enabled to employ a thin plate of celluloid for the outer covering, thereby not only reducing the expense, but also making it possible to use celluloid in its most effective form, since a thin plate of this material possesses valuable characteristics not found, or at least imperfectly developed, in a thick plate. For one thing a thin cover of celluloid may be better seasoned than a thick or massive cover, and it is more springy and pliant, while possessing the same wear-resisting, smooth, waterproof, and other qualities which render the ball desirable in the game of golf. At the same time I am enabled to use in the shell a large mass of gutta-percha, which possesses to a superlative degree the quality of storing up force from a blow, which is necessary in a golf-ball. It will be understood that it is important in view of the small size of the ball used in this game and the necessity of its carrying or flying a great distance to use in its construction such a combination of materials as will utilize to advantage every portion of the mass of the ball, or, in other words, it is important to eliminate all dead-weight therefrom. Hence it is desirable not only to provide a core or filling having the desired qualities, but also to provide therefor a shell which not only protects said filling, but also itself contributes in a large degree to the flying power or efficiency of the ball, while preventing a light blow from affecting the highly-elastic interior. This desideratum is obtained in this instance by reducing the thickness of the celluloid cover, so as to retain only enough thereof to provide a wear-resisting, waterproof, and otherwise satisfactory exterior for the balls, and lining such cover with a relatively thick mass of gutta-percha, which not only has great carrying power, but is tough. The celluloid overcomes the objections to the use of a plain gutta-percha exterior, while all the advantages of the gutta-percha are retained.

In using the term "compression" herein as applied to the rubber sphere B or to the core A, I refer to the compressive tendency, which may or may not cause a condensation of the bulk of the material, the presence or absence of such condensation depending upon the character of the material used and upon the degree of pressure employed in forming the ball.

A gutta-percha and celluloid shell may be otherwise formed within the scope of my improvements and may be used with other fillings than those herein specifically mentioned.

The herein-described process is made the subject-matter of my pending application, Serial No. 96,992, filed March 6, 1902.

Having described my invention, I claim—

1. A playing-ball comprising a spherical rubber envelop distended by a filling of gutta-percha, and a shell built up of gutta-percha and celluloid and compressed upon said envelop.

2. A playing-ball comprising a relatively large spherical core of gutta-percha, a solid soft-rubber spherical envelop thereon, a gutta-percha shell upon said envelop, and a celluloid covering upon said shell.

3. A playing-ball comprising a spherical gutta-percha core, a soft-rubber envelop thereon, a relatively thick gutta-percha shell upon said envelop, and a celluloid covering upon said shell; said celluloid covering being materially thinner than said gutta-percha shell.

4. A playing-ball comprising a spherical gutta-percha core, a solid soft-rubber spherical envelop thereon, a gutta-percha shell upon said envelop, and a celluloid covering upon said shell; said celluloid and gutta-percha shell being compressed upon said envelop.

5. A playing-ball comprising a spherical gutta-percha core, a solid soft-rubber envelop thereon, a gutta-percha shell upon said envelop, and a celluloid covering upon said shell; said celluloid shell being formed in segments welded and compressed upon the filled gutta-percha shell.

6. A playing-ball comprising a gutta-percha spherical core, a soft-rubber envelop thereon, a gutta-percha shell upon said envelop, and a celluloid covering upon said shell; said gutta-percha shell being formed in segments welded and compressed upon said soft-rubber envelop.

7. A playing-ball comprising a gutta-percha core, a soft-rubber envelop, a gutta-percha shell upon said envelop, and a celluloid covering upon said shell; said gutta-percha and celluloid shell components being made in sections all of which are welded and compressed upon said soft-rubber envelop.

8. A playing-ball comprising a gutta-percha core, a soft-rubber envelop thereon, a gutta-percha shell upon said envelop, and a celluloid covering upon said shell; said gutta-percha and celluloid shell components being made in sections which are welded and compressed upon said filling, and the weld or joint in the celluloid covering crossing the weld or joint in the gutta-percha shell.

9. A playing-ball comprising a core which is inclusive of a spherical body of india-rubber, and a shell compounded of gutta-percha and celluloid and compressed upon said core.

10. A playing-ball comprising a relatively large sphere of gutta-percha, a shell compounded of gutta-percha and celluloid, and an intervening layer of soft, springy material; said shell being compressed upon said intervening layer and core.

11. A playing-ball comprising a yielding filling and a shell compounded combined of welded segments of gutta-percha and welded segments of celluloid; the welds or joints crossing.

12. A playing-ball comprising a yielding filling and a shell compressed thereon; said shell being compounded of gutta-percha and celluloid.

13. A playing-ball comprising a hard core, a soft and highly-elastic sphere thereon, a harder and less elastic sphere upon said sphere, and a still harder and still less elastic casing upon the last-mentioned sphere.

14. A playing-ball comprising a relatively hard outer shell, an inner gutta-percha shell, and a spherical filling within said gutta-percha shell, at least the exterior of said filling consisting of soft rubber.

15. A playing-ball comprising a hard core, a soft and highly-elastic sphere expanded thereon, a harder and less elastic sphere upon said sphere, and a still harder and still less elastic casing upon the last-mentioned sphere.

16. A playing-ball comprising a relatively hard outer shell, an inner gutta-percha shell, a rubber sphere within said gutta-percha shell, and a hard core upon which said rubber sphere is expanded.

17. A playing-ball comprising a hard core incased in a highly-yielding sphere, said sphere being in a state of expansion upon said core, a more resisting shell layer upon said sphere, and a still more resisting outer layer upon said shell layer.

ELEAZER KEMPSHALL.

Witnesses:
B. C. STICKNEY,
JOHN O. SEIFERT.